Figures 1, 2:
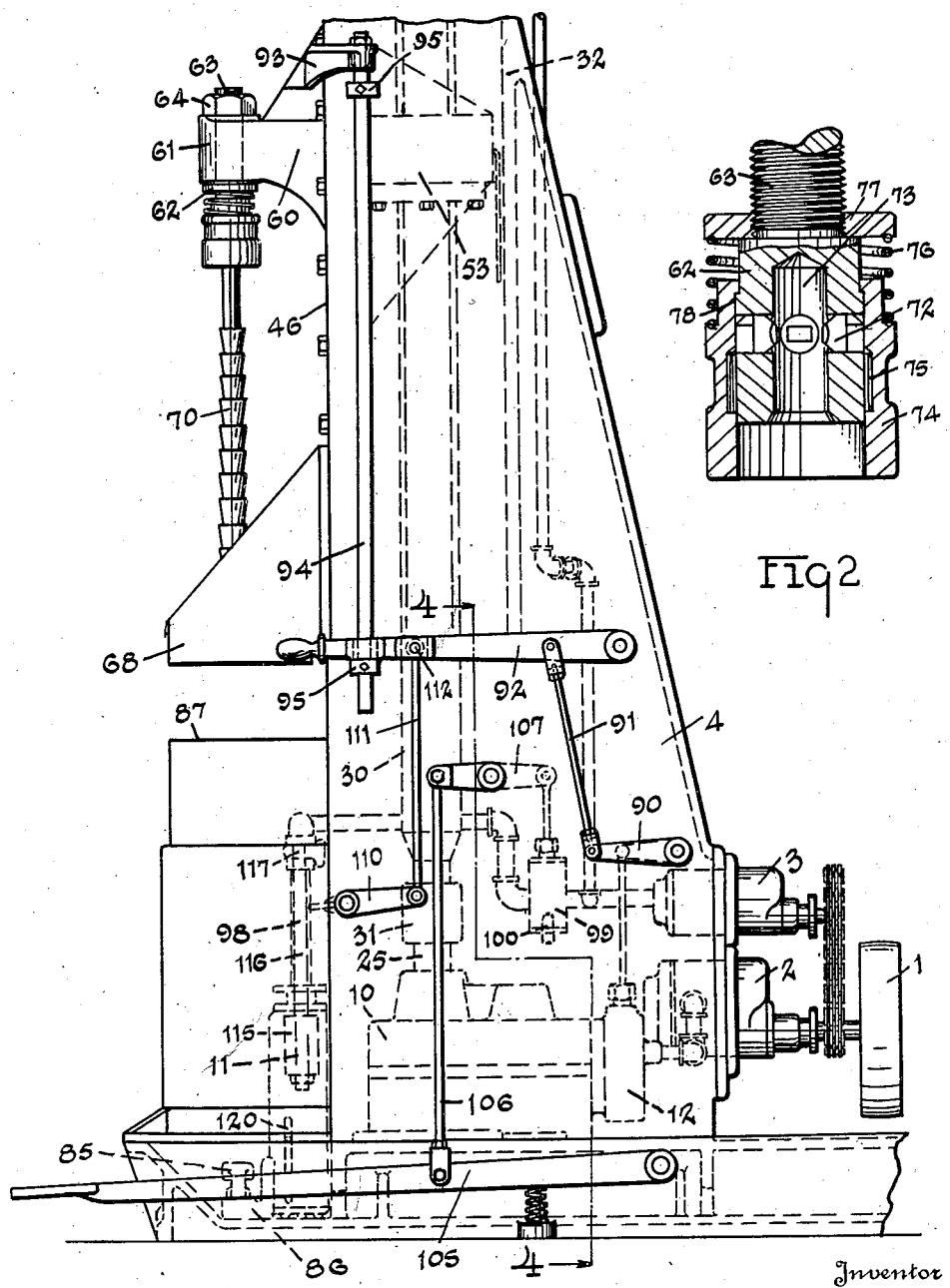

Oct. 10, 1933.   F. J. LAPOINTE   1,929,593
HYDRAULIC SCREW BROACHING MACHINE
Filed Dec. 4, 1931   4 Sheets-Sheet 1

Inventor
Francis J. Lapointe
By Faust F. Crampton
Attorney

Oct. 10, 1933.     F. J. LAPOINTE     1,929,593
HYDRAULIC SCREW BROACHING MACHINE
Filed Dec. 4, 1931     4 Sheets-Sheet 2
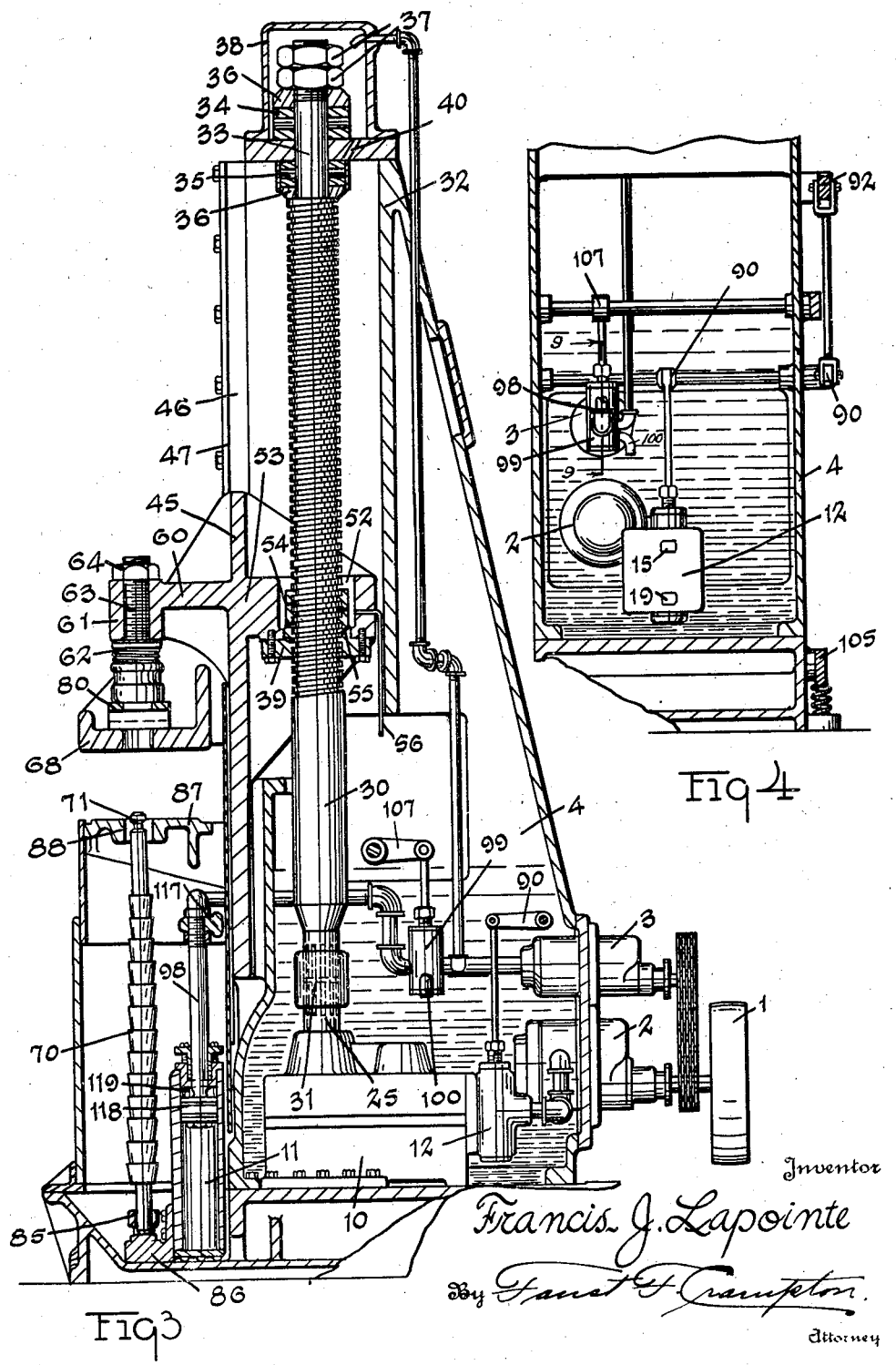

Oct. 10, 1933.  F. J. LAPOINTE  1,929,593
HYDRAULIC SCREW BROACHING MACHINE
Filed Dec. 4, 1931  4 Sheets-Sheet 3

Inventor
Francis J. Lapointe
By Faust F. Crampton
Attorney

Oct. 10, 1933.    F. J. LAPOINTE    1,929,593
HYDRAULIC SCREW BROACHING MACHINE
Filed Dec. 4, 1931    4 Sheets-Sheet 4

Inventor
Francis J. Lapointe
By Faust F. Crampton
Attorney

Patented Oct. 10, 1933

1,929,593

UNITED STATES PATENT OFFICE 1,929,593

HYDRAULIC SCREW BROACHING MACHINE

Francis J. Lapointe, Ann Arbor, Mich.

Application December 4, 1931. Serial No. 578,973

6 Claims. (Cl. 90—33)

My invention has for its object to provide a hydraulically screw operated broaching machine whereby a steady advancement of the broach may be produced by a hydraulic driving element that is without material amount of mass and the inertia of the moving mass will be cushioned by the leakage of the liquid when there is any change in the movement and, consequently, variations in speed may be readily manually produced as desired and also may be automatically produced according to the resistance of the work to the broach movement.

As is well known in connection with broaching machines, screws have heretofore been used for operating the drawhead to which the broach is connected, the screws being driven by gear wheels that have a large amount of mass, with the result that it is impossible to quickly stop the broach in case of injury to the broaching teeth by reason of improper placement, or displacement, of the work or by reason of the teeth coming in contact with a metal that is crystallized or is unusually hard, or by reason of improper heat treatment of the broaching tool, etc. The screw in the construction embodying my invention is driven by a rotary hydraulic motor that is responsive to the change in the rate of transmission of the oil. The rate of transmission of the oil can be readily and quickly varied manually and, furthermore, the pressure can be built up immediately upon resistance to the rotation of the screw due to the resistance to the movement of the broach through the work and consequently as the teeth of the broach are progressively engaged and released, and in case of engagement of "hard spots" in the metal, the pressure in the motor will be built up by the continued transmission of the oil from the pump to the motor to overcome the resistance and will be eased off immediately upon reduction of the cutting resistance. Furthermore, the rotating element or elements of the motor, being hydraulically cushioned by leakage, will prevent jarring or vibration and, consequently, prevent wave formation or irregular cutting. It will produce movement in the broach that normally is constant and only gradually varies in rate as tool resistance is encountered. The invention thus eliminates "bumping", that is, sudden changes in rate as the tool engages the "hard spots" or as the number of teeth that perform cutting operations at the same time varies as the tool passes through the work. The invention thus provides all the work advantage of the screw broaching machine, that is steady advancement of the broaching tool, and avoids the disadvantages of a screw broaching machine that is, injury done by the inertia of the driving mass and also the advantage of hydraulically operated machines, namely, the cushioned shock absorbing effect of the liquid transmission and the control of the broach movement and avoids the disadvantage of hydraulically operated broach machines, namely, that of extreme irregular broach movement by reason of extreme elasticity of hydraulic pressure due to leakage and the resultant variation in pressure.

The invention may be contained in broaching machines of different forms and, structures containing my invention, may be varied in their details and still embody my invention. To illustrate a practical application of the invention, I have selected a broaching machine embodying the invention as an example of the various structures, and the details of such structures that contain the invention, and shall describe the selected structure hereinafter, it being understood that variations may be made and that certain features of my invention may be used to advantage without a corresponding use of other features of the invention and without departing from the spirit of the invention. The particular structure selected is shown in the accompanying drawings.

Figure 5:
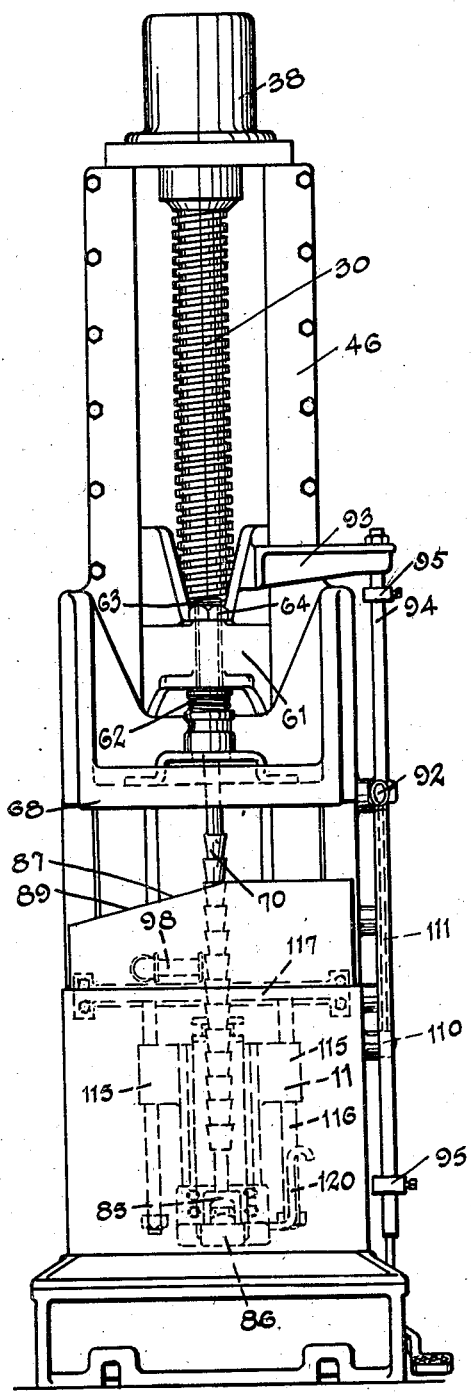
Figure 6:
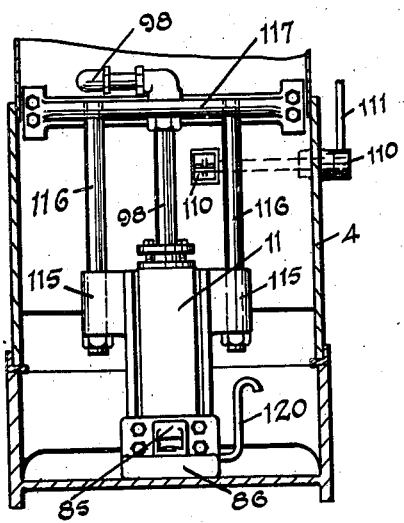
Figure 7:
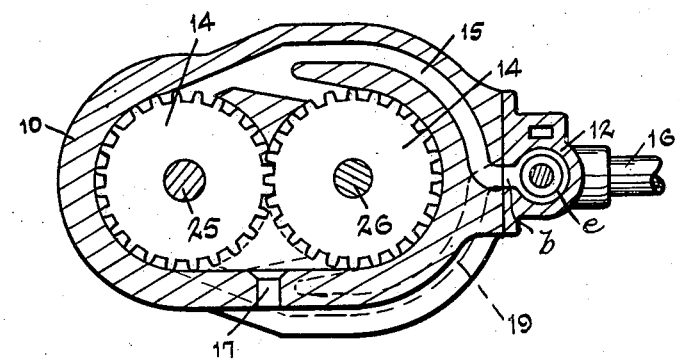
Figure 8:
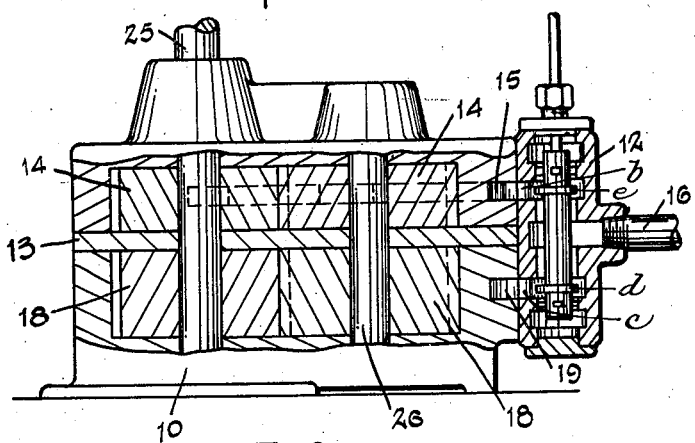
Figure 9:
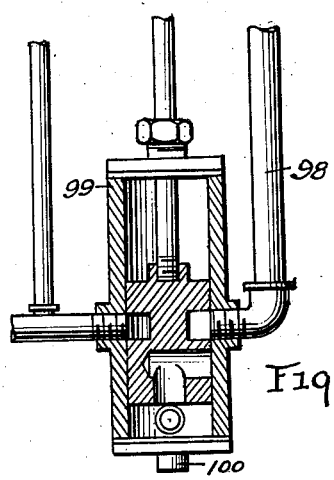

Fig. 1 illustrates a side view of the broaching machine referred to. Fig. 2 illustrates the automatic broach locking head for connecting the broach to the drawhead. Fig. 3 illustrates a view of a section through the broaching machine illustrated in Fig. 1. Fig. 4 is a view of a section taken on the plane of the line 4—4 indicated in Fig. 1. Fig. 5 illustrates a front view of the machine. Fig. 6 illustrates a broach lifting cylinder. Fig. 7 illustrates a view of a section taken on a horizontal plane through a hydraulic motor. Fig. 8 illustrates a view of a section through the motor taken on the plane located at right angles to the plane on which the section, shown in Fig. 7, is taken. Fig. 9 illustrates a view of a section of a valve taken on the plane of the line 9—9 shown in Fig. 4.

The broaching machine illustrated in the drawings is driven by a pulley 1 that operates a pair of pumps 2 and 3. The pumps have portions that are located within an oil reservoir 4 from which they draw the oil through suitable ports located in their respective housings and subject the oil to a pressure that is conveyed to the hydraulically actuated elements of the machine.

The pump 2 is connected to a hydraulic gear motor 10, while the pump 3 is connected to a cylinder 11. The hydraulic motor 10 operates to move the broach reciprocally, while the cylinder 110

11 operates to displace the broach from and reconnect the broach to the drawhead of the machine to enable placement of the work in position.

The motor 10 comprises two parts, one for performing the working stroke and the other for performing the return stroke. It has a valve member and casing 12 for directing oil from the pump 2 to either one side or the other of the partitioning wall 13 that divides the casing of the motor 10 into two parts. In one of the chambers formed by the partition 13, there are located a pair of hydraulic pump gears 14 and the wall of the casing is provided with inlet passageways 15 that communicate with the casing of the valve 12. A movable member of the valve 12 operates to close and open the connection between the passageways 15 and the pump 2 through the pipe 16. The outlet of the chamber in which the pump gears 14 are located is through the port 17. In the other chamber of the casing of the motor 10 there are located similar pump gears 18 and the wall of the hydraulic motor has passageways 19 similar in form to the passageways 15 but located on the opposite side of the motor. The chamber having the pump gears 18 is also provided with a suitable port, similar to the port 17, for permitting the escape of oil to the reservoir. The two parts of the hydraulic pump are similar in form, the inlet and outlet ports being so located in the wall of the casing of the motor to cause the hydraulic gears to rotate in opposite directions.

The valve casing and the movable valve member 12 is so constructed as to direct the oil from the pump 2, first through the passageways 15, when the movable valve member is in one position, and through the passageways 19 when the movable valve member is in the other position. As shown in Fig. 8 the movable valve member is located at an intermediate position. When it is raised the flanges $e$ and $d$ close the passageway from the pipe 16 to the port $c$ and connects the passageway from the pipe 16 and the port $b$ and produces rotation of the shaft 25 in one direction. Return movement of the movable valve member locates the flange $e$ in the passageway leading from the pipe 16 to the port $b$ and the gears 14 cease to rotate. The return movement also shifts the flange $d$ to open the connection between the port $c$ and the pipe 16 and causes rotation of the gears 18 in a direction to reverse the rotation of the shaft 25.

One of each pair of pump gears 14 and 18 is keyed to the shaft 25. The other of each pair of pump gears may be rotatably supported upon the shaft 26. The gears 14 and 18 that are connected to the shaft 25 operate to cause reciprocatory movements of the drawhead, one pair of the gears operating to move the broach head to produce a working stroke and the other pair, a broach return stroke, depending upon which of the passageways of the hydraulic motor is connected to the pump 2 through the valve casing 12.

The shaft 25 is connected to the screw 30 by means of the splined collar 31. The screw 30 is provided with suitable thrust bearings in the upper end of the frame 32 of the machine. It may be provided with a neck 33 and suitable roller thrust bearings 34 and 35 are located on the opposite sides of the upper end of the frame 32 and between the end of the frame and the collars 36. The neck 33 is provided with a threaded end on which may be located suitable adjusting and locking nuts 37. Preferably, the outer end of the screw is surrounded by a housing 38 in which lubrication may be maintained by oil drawn from the reservoir 4 through the operation of the pump 3 and directed through pipes that by-pass the cylinder 11 to the reservoir. The upper end of the frame 32 may be provided with a duct 40 to allow the oil to move over the lower thrust bearing 35. The oil will then pass down over the thread of the screw 30 and through the nut 39 and into the reservoir 4 into which the screw 30 extends to connect the motor 10 that is also located in the reservoir 4. This operates to maintain a constant lubrication of the screw and its bearings and the broach driving nut during the operation of the machine.

The broach driving nut 39 is located in the draw plate 45 which is located in a pair of ways 46 that are formed in the sides of the frame 32 of the machine, the edges of the plate 45 being covered by guide strips 47 that are bolted to the sides of the frame 32. The draw plate is preferably substantially one-half the length of the ways to insure broach alignment and steadiness of operation of the broach. The nut 39 is located in an opening 52 formed in a boss located on an overhanging braced shelf part 53 of the plate 45. The shelf part extends inwardly and over the oil reservoir 4. The nut is bolted to the underside of the shelf part 53 and extends into the opening 52. It is shaped to form an annular chamber 54 within the opening 52 in which the oil, descending along the screw 30, will collect and thus insure lubrication of the nut. Suitable ducts 55 may be located in the side walls of the nut 39 to insure surface distribution of the lubricant within the nut 39. Also, an overflow duct or pipe 56 may be connected to the shelf 53 and communicate with the opening 52 to direct surplus of the lubricant, in a definite stream, from within the opening 52 to the reservoir 4.

The plate 45 is also provided with a second overhanging braced shelf part 60 having the boss 61 to which is secured the drawhead 62. The drawhead 62 is provided with an automatic broach locking member for automatically connecting and releasing the end of the broach from the drawhead. The drawhead 62 has a threaded stem 63 and is secured to the plate 45 by means of the nut 64. The drawhead is thus reciprocated by the operation of the hydraulic motor 10 above the work plate of the machine. The work plate 68 extends across the front of the machine and is suitably bolted to the frame 32. The lower side of the work plate operates to engage the work while the broach is raised and is pulled through the work by the drawhead. The work then falls from the work plate 68 and is directed or conveyed from the machine in any suitable manner. The drawhead is then lowered which lowers the broach and upon approaching the work plate the broach is released and allowed to descend to afford opportunity for insertion of work in position against the under surfaces of the work plate 68.

The broach 70 is provided with a head 71 while the drawhead 62 has a plurality of slidable dogs 72 that are moved radially with respect to the axis of the drawhead and are so formed as to extend into the socket 73 to lock the head 71 of the broach 70 in the socket 73. The dogs 72 are located in openings formed in the wall which is produced by the formaton of the socket 73 within the drawhead and are engaged by a shell 74 that surrounds the drawhead 62. The shell 74 has a recessed portion 75 that enables the outward movement of the dog 72 to release the head 71 of the broach. The shell 74 is spring pressed by a spring 76 located intermediate a shoulder formed on the shell 75 and a washer 77 surrounding the neck 63 of the drawhead. The shell 74 and the drawhead 62 are provided with abutting shoulders 78 that limits the downward movement of the shell 74 by the operation of the spring 76. The shell 74 has such a length that its lower edge will be located below the lower end of the drawhead 62 when it has been moved relative to the drawhead by the spring 76 to cause the engagement of the shoulder 78. Also, the recess 75 within the inner wall of the shell 74 is so located that when the shell 74 is depressed by the operation of the spring 76, the dogs will be forced from the recess 75 and engaged against outward movement by the portion of the shell 74 that has a diameter smaller than that of the inner surface of the recess 75, which operates to push the dogs inwardly and cause their inner ends to protrude into the socket 73, to lock the head of the broach.

The head 71 of the broach is provided with sloping or beveled edges and the dogs 72 are provided with upper and lower sloping or beveled edges at their ends and so that any pressure or tension on the broach, when entering or being drawn therefrom, will operate to produce an outward pressure on the dogs 72. The movement of the dogs 72 will be resisted or permitted, dependent upon the relative location of the shell 74, that is, dependent on whether the recess 75 is located in position to permit the dogs to be slid outwardly to release the broach when there is a downward pull, either by the weight of the broach, or the broach head when inserted, will push the dogs radially with respect to the axis of the broach and broach head to permit the broach to seat itself in the socket when the recess 75 registers with the outer ends of the dogs. The releasement of the shell 74 will force the dog 72 inward and lock the broach head 71 within the socket. Thus, when the drawhead 62 descends to the work plate 68, the upper side of the work plate may be engaged by the shell 74 as the drawhead 82 descends and releases the broach and allow it to further descend or drop to permit work to be inserted between the upper end of the broach and the work plate.

If desired, a suitable bracket 80 may be located on the upper side of the work plate 68, or formed integrally therewith, to engage the edge of the shell 74 to release the broach.

When the broach is released from the drawhead 62, it is allowed to drop into a socket 85 formed in a bracket 86 that is connected to the cylinder 11. It is guided in this downward movement by the work deflector plate 87 in which an opening 88 is formed to permit free and guided movements of the broach therethrough. The deflector plate 87 has a sloping part 89 for directing the work to one side of the machine when the broach has been pulled through the work and the work has been released from the work plate 68. When the lower end of the broach is located in the socket its upper end is located at a point below the under surface of the work plate 68 so as to permit the insertion of work in position between the broach and the work plate. The broach is then lifted and inserted through the work and the work plate and into the drawhead by the operation of the cylinder 11. When the motor 10 is started to produce a working stroke, the drawhead 62 is moved from the upper side of the work plate while the cylinder 11 follows upward, maintaining the head 71, of the broach, in the socket 73 until the drawhead 62 has been raised sufficiently to enable the shell 74 to force the dog 72 into the socket 73 and engage the head 71 and thus lock the broach in the drawhead. Continued upward movement of the drawhead, by the operation of the hydraulic motor 10, causes the broach to complete its cutting stroke. In the meantime the pressure of the oil in the cylinder 11 is released and the cylinder, by its own weight, descends to a position to again receive the broach when it is released from the drawhead upon the return movement of the broach as before.

The hydraulic gears 18 of the motor 10 have a larger displacement than the hydraulic gears 14 and receive a larger total oil pressure than the hydraulic gears 14, but, since they have a larger displacement, they move more slowly than the gears 14 and, since the gears 18 rotate the screw 30 in a direction to pull the broach through the work, they produce a slower and a steadier operation of the broach. When the passageways 15 and 19 are interchanged in their connection with the pump 2, the hydraulic gears 14 reverse the direction of the screw 30 and cause a quick return by reason of the relatively smaller displacement of the smaller hydraulic gears 14.

The interchange of connection with the pump 2 is produced by the movement of the movable member of the valve 12 which is connected to the lever 90 and by means of a link 91 that is connected to the lever 92. The draw plate 45 is provided with an arm 93 that extends to the side of the machine and is provided with a rod 94 that extends through an opening formed in the lever 92. The rod 94 is provided with adjustable stops 95 that are adapted to engage the lever 92 near the completion of the stroke of the broach. One stop 95 is so located on the rod 94 that when the drawhead 62 is raised to the desired point, the lever 92 is engaged by the stop which operates through the link 91 to close the port or passageway to the hydraulic gears 18, located in one chamber of the motor 10, and open the passageway through the chamber having the hydraulic gears 14 which causes automatically the return of the drawhead until it is brought to a stop against the work plate and so as to release the broach. When the drawhead is brought to a stop against the work plate the upper stop 95 engages the lever 92 and throws the valve 12 into its central or neutral position.

If desired, the cylinder 11 may be retained in its uppermost position to receive the lower end of the broach 70, but in order to eliminate the time required for the descent of the cylinder 11, the cylinder 11 is preferably allowed to descend immediately after the delivery of the broach into the drawhead. The broach may be dropped into the socket 85 upon the completion of the return stroke of the machine and immediately thereafter the work may be located in position, whereupon the cylinder 11 is raised.

An auxiliary pump 3 is preferably provided for the operation of the cylinder 11, although the pump 2 may be utilized for operating the cylinder 11 by using suitable controlling valves to connect and disconnect the cylinder with the pressure line from the pump 2. Preferably, the cylinder 11 is lowered by its own weight which eliminates the necessity of connecting a return pipe line with the upper end of the cylinder to the reservoir.

The cylinder 11 is connected by means of the pipe 98 to the pump 3. A valve 99 is located in the pipe line 98 for controlling the flow of the oil from the pump 3 to the cylinder 11. The valve 99 is a suitable slide valve having, preferably, an outlet port 100, the movable member of the valve 99 and the shell of the valve being so formed as to direct oil either to the cylinder 11, through the pipe 98 to raise the cylinder, or to allow the return of the oil from the cylinder 11 through the pipe 98 and the outlet port 100, as the cylinder descends by its weight.

The valve 99 is connected to a lever 105 by means of the link 106 and a bellcrank lever 107. The lever 105 is preferably a pedal lever which affords a convenient means for operating the valve 99. When, therefore, it is desired to lift the broach 70 through the work that may be placed on the under side of the work plate, and into the draw head 62, the lever 105 is depressed which connects the pump 3 with the cylinder 11 and causes it to raise the broach 70. The lever 92 may then be lowered to manipulate the valve 12 to connect the pump 2 with the lower chamber and produce the lifting stroke of the broach 70. The cylinder 11 follows the broach as the draw head 62 is lifted and until the shell 74 engages the dogs 72 to lock the broach head in the drawhead.

Preferably, the lever 92 is lowered by the cylinder 11 when the cylinder reaches a point near the completion of its upward movement. The upper end of the cylinder 11 engages a lever 110 which is connected, by means of a rod 111 and a pin 112, with the lever 92. This automatically initiates the working stroke of the broach. The foot is then released from the pedal lever 105 to short circuit the oil from the pump 3 to the reservoir and allow the oil from the cylinder 11 to pass through the pipe 98 to the reservoir as the cylinder 11 descends by its own weight preparatory to its receiving the broach 70 when it is released and allowed to fall from the drawhead 62.

The cylinder 11 may be provided with a pair of protruding bosses 115 having openings for receiving a pair of guiding bars 116 that may be connected to a cross bar or frame 117. The cross frame 117 is connected to the frame of the machine. The piston 118 is a fixed piston that is connected to the lower end of the pipe 98. The pipe 98 has a pair of ports 119 for permitting the oil to pass to the upper end of the cylinder above the piston. An upwardly extending bent pipe 120 may be connected to the lower end of the cylinder 11 to permit any oil that leaks by the piston 118 to pass into the base of the machine. The curved pipe 120 prevents the entry of any chips into the cylinder produced in the broaching operations.

I claim:

1. In a broaching machine, a drawplate, a drawhead connected to the drawplate, means for connecting the broach to the drawhead, a hydraulic motor having a rotor for operating the drawplate, a cylinder and piston for raising the broach to connect the broach with the drawhead, and means operated by the piston and cylinder for starting the motor.

2. In a broaching machine, a drawhead, a hydraulic motor for reciprocating the drawhead, the drawhead having means for connecting a broach to the drawhead, a broach receiving socket member, a motor for operating the socket member to raise the broach to the broach head, a source of liquid, means for subjecting the liquid to pressure, valves for controlling the flow of the liquid to the said motors, means interconnecting the drawhead and second named motor with the valve of the first named motor for initiating movement of the first named motor.

3. In a broaching machine, a drawhead, a hydraulic motor for reciprocating the drawhead, the drawhead having means for connecting a broach to the drawhead, a broach receiving socket member, a motor for operating the socket member to raise the broach to the broach head, a source of liquid, means for subjecting the liquid to pressure, valves for controlling the flow of the liquid to the said motors, means interconnecting the drawhead and the second named motor with the valve of the first named motor for producing reciprocatory movements of the drawhead and by the movement of the second named motor for initiating movements of the drawhead, means for operating the valve of the second named motor for producing sequential movements of the said motors.

4. In a broaching machine, a drawhead, a hydraulic motor for reciprocating the drawhead, the drawhead having means for connecting a broach to the drawhead, a broach receiving socket member, a motor for operating the socket member to raise the broach to the broach head, a source of liquid, means for subjecting the liquid to pressure, valves for controlling the flow of the liquid to the said motors, means interconnecting the drawhead and the second named motor with the valve of the first named motor for producing reciprocatory movements of the drawhead and by the movements of the second named motor for initiating movements of the drawhead, means for operating the valve of the second named motor for producing sequential initial movements and periodical overlapping movements of the motor.

5. In a broaching machine, a drawplate having a drawhead, the machine having ways for guiding the drawplate vertically in its reciprocatory movements, a hydraulic motor having a rotor, the axis of the rotor extending vertically, a screw connected to the rotor of the motor, a nut connected to the drawplate for vertically reciprocating the drawhead, an oil reservoir, the rotor located in the lower end of the reservoir, and means for directing oil to the upper end of the screw for lubricating the screw.

6. In a broaching machine, a drawplate having a drawhead, a nut connected to the drawplate, a screw extending through the nut and the drawplate, a hydraulic motor having a rotor connected to the screw for rotating the screw, the drawhead having means for connecting a broach to the drawhead, a broach receiving socket member, a cylinder and piston combination for raising and lowering the socket member to raise the broach to the broach head for connecting the broach to the drawhead, a source of liquid, means for subjecting the liquid to pressure, valves for controlling the flow of the liquid to the said motor and to the said cylinder, means interconnecting the drawhead and the cylinder and piston combination with the valve of the motor for initiating movement of the motor before the completion of the movement of the cylinder and piston combination and producing reciprocatory movements of the drawhead.

FRANCIS J. LAPOINTE.